May 14, 1929.  H. O. WOODRUFF  1,713,157
AUTOMOBILE HEADLIGHT
Filed Oct. 26, 1926  2 Sheets-Sheet 1
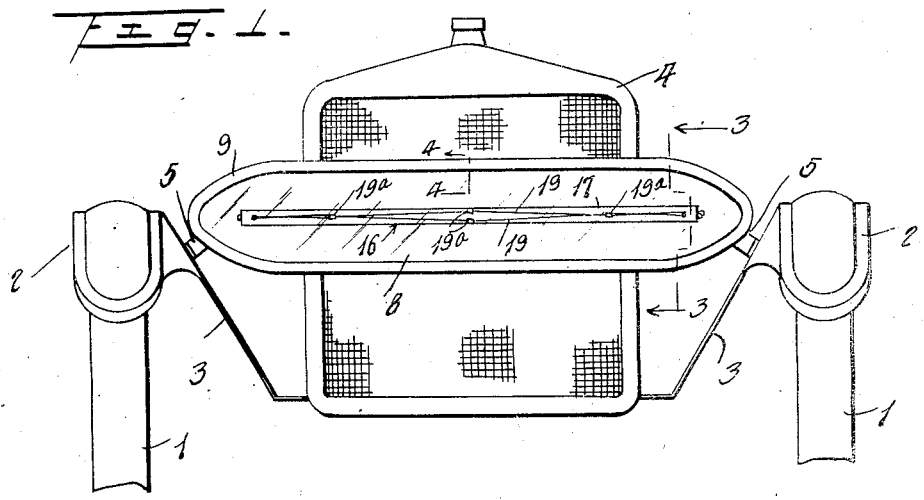
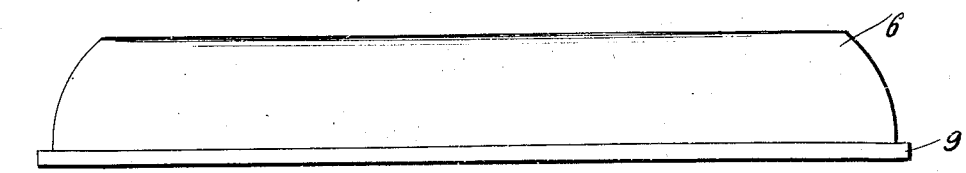
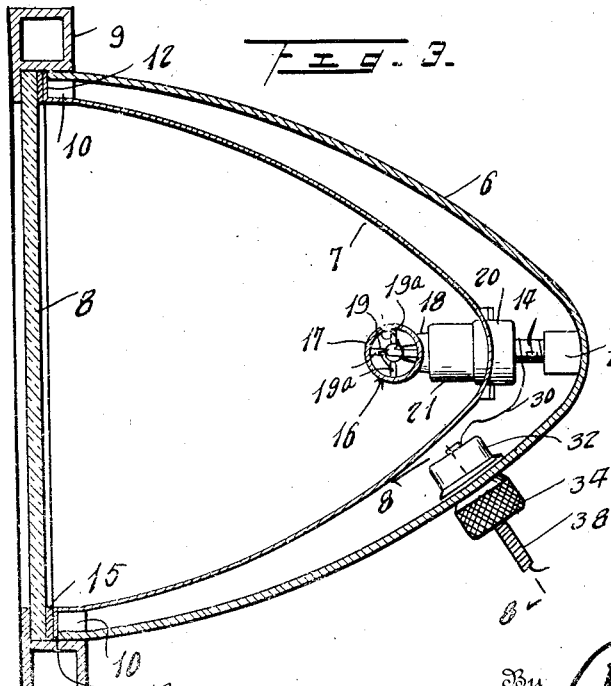
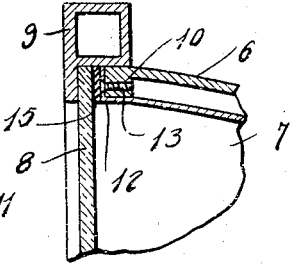
Inventor
H. O. Woodruff

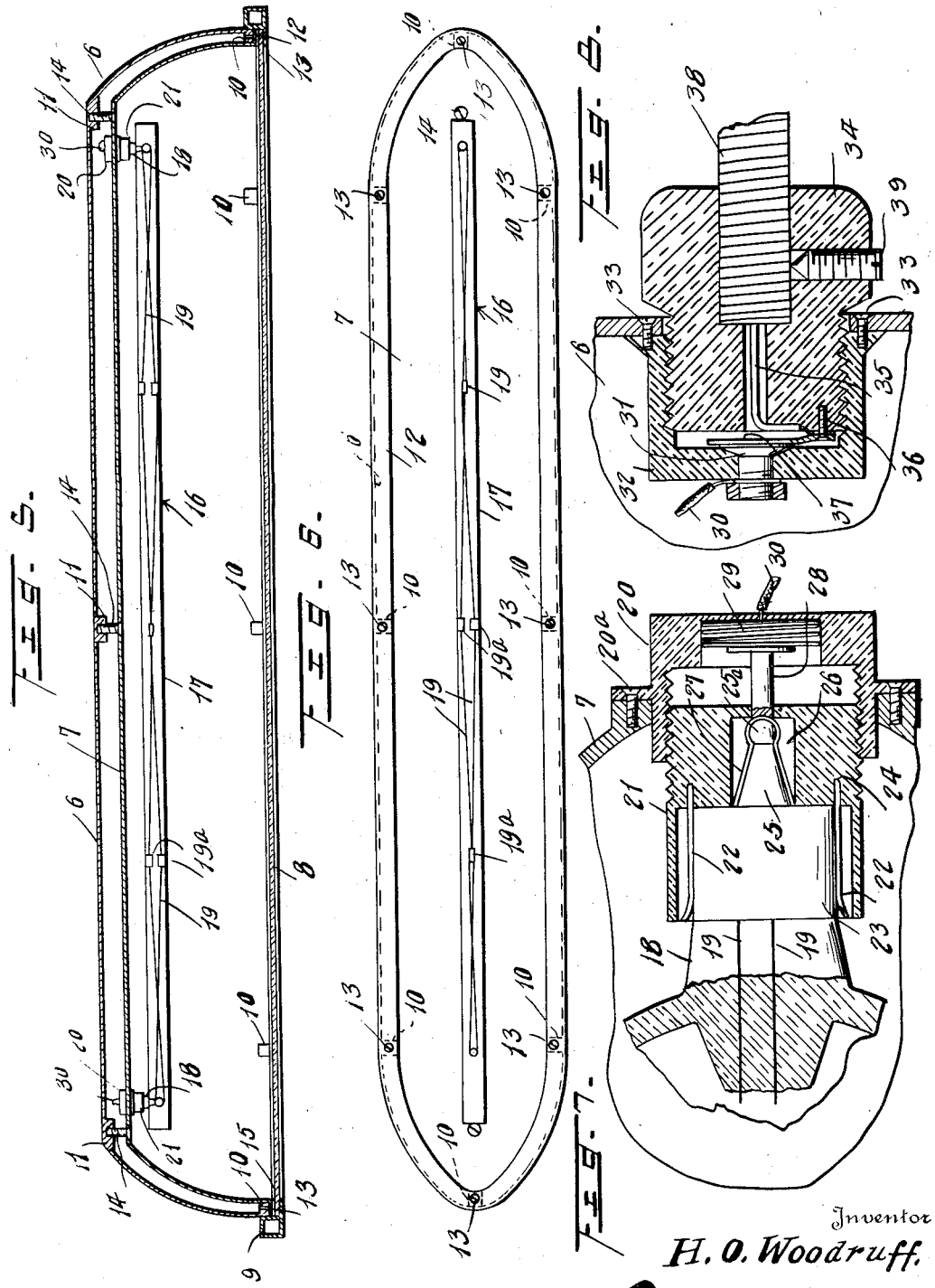

Patented May 14, 1929.

1,713,157

UNITED STATES PATENT OFFICE.

HAROLD OTIS WOODRUFF, OF BROWNVILLE, NEW YORK.

AUTOMOBILE HEADLIGHT.

Application filed October 26, 1926. Serial No. 144,280.

This invention relates to automobile headlights which, in accordance with the present practice, are used in pairs. This practice makes night driving hazardous and unsatisfactory owing to the difficulty experienced in obtaining a clear vision of the roadway when the sources of illumination of the headlights are not of equal brilliance and properly focused and when the source of illumination of one of the headlights is not burning.

This invention has for one of its objects to effect the brilliant illumination of the roadway in advance of an automobile by the use of but a single headlight having but a single source of illumination, and to attain this end the invention comprehends the employment of a headlight adapted to reflect a wide beam of light which will illuminate the center as well as the sides of the roadway.
A further object of the invention is the provision of a headlight which will reflect a beam of light which will appear to the driver of an oncoming automobile to be greater in width than it actually is, whereby to compel such driver to give to the other at least half of the roadway.

A further object of the invention is the provision of a headlight wherein the source of illumination may be readily and quickly focused without the aid of a screwdriver or other tool.

A still further object of the invention is the provision of a headlight of the character stated which shall be simple and can be readily secured in place, and which will be attractive and add to the appearance of the automobile.

With the foregoing and other objects in view, the invention consists of the novel construction, combination and arrangement of parts hereinafter fully described and claimed, and illustrated in the accompanying drawings, wherein:

Figure 1 is an elevational view illustrating the application of the headlight to an automobile, Figure 2 is a detail top plan view of the headlight, Figure 3 is a sectional view taken on the vertical planes indicated by the line 3—3 of Figure 1, Figure 4 is a sectional view taken on the vertical plane indicated by the line 4—4 of Figure 1, Figure 5 is a sectional view taken on a horizontal plane extending longitudinally and centrally through the headlight, Figure 6 is a view in front elevation of the headlight with the lens and lens retaining member removed,

Figure 7 is a sectional view on an enlarged scale illustrating the manner in which the source of illumination is secured in place, and Figure 8 is a sectional view on an enlarged scale taken on the plane indicated by the line 8—8 of Figure 3.

Corresponding and like parts are referred to in the following description, and designated in the several views of the accompanying drawings, by similar reference characters.

In the drawings, 1 designates the front wheels, 2 the front fenders, 3 the fender aprons and 4 the radiator of an automobile. The headlight is adapted to be secured to and between the fender aprons 3 by brackets 5. It is of elliptical formation in plan, and is long enough to extend from one of the fender aprons 3 to the other. The headlight comprises a casing 6, reflector 7, lens 8 and lens retaining member 9. The casing 6 is provided at its front edge with relatively spaced lugs 10 having threaded openings and at its rear side with relatively spaced lugs 11 having threaded sockets. The reflector 7 is provided at its front edge with an outturned flange 12 which rests against the front edge of the casing 6, and is secured in place by machine screws 13 passing through its flange and engaging the lugs 10 and screws 14 passing through its rear side and engaging the lugs 11. A gasket 15 is positioned between the lens 8 and flange 12, and the member 9 may be secured to the casing 6 in any well known or appropriate manner.

The source of illumination for the headlight consists of an incandescent electric lamp 16 which embodies an elongated tube 17 provided at its ends with studs 18, and filaments 19 which are arranged within the tube as shown and supported by lugs $19^a$ constituting parts of the tube. The ends of the filaments 19 are disposed in the studs 18. Those ends of the filaments located in one of the studs 18 are grounded to the reflector 7, and those ends of the filament located in the other stud are adapted to be connected to the source of current. Sockets 20 are secured to the rear side of the reflector 7 as at $20^a$, and are internally screw threaded for the reception of the screw threaded portions of sockets 21. The socket 21 receive the studs 18 of the lamp 16, and are adjustably supported by the sockets 20 to permit the lamp to be adjusted into and maintained in the focal center of the reflector 7. The studs 18 are retained within the sockets 21 by springs 22 which are of the leaf type and secured at their rear ends to the sockets. The front or free ends of the springs 22 are laterally deflected to permit the ready insertion of the studs 18 into the sockets 21. The studs 18 are provided with cylindrical portions 23 which fit in the sockets 21 against the bases 24 of the latter and with which the springs 22 contact. At the rear sides of their portions 23, the studs 18 are provided with conical extensions 25 which are provided with spherical terminals 25ª. The extensions 25 occupy recesses 26 in the bases 24 of the sockets 21, and together with their spherical terminals 25ª, are engaged by clamps 27 which are secured within the recesses 26 and are similar in contour to the extensions and their terminals. The clamps 27 assist the springs 22 to retain the studs within the sockets 21. The sockets 20 carry conductor pins 28 which pass through openings in the bases 24 of the sockets 21 and contact with the clamps 27. The conductor pins 28 have a sliding fit in the openings of the sockets 21 and are yieldingly held in contact with the clamps 27 by expansion springs 29. One of the pins 28 is grounded to the reflector 7 and the other has connected thereto a lead 30 which in turn is connected to the contact 31 of a socket 32.

The socket 32 is secured to and within the casing 6 as at 33, and is adapted to receive a plug 34 through which a lead 35 passes. The lead 35 is secured to the plug 34 by a screw 36 which also secures to the plug a spring contact 37 bearing against the contact 31. A flexible sheath 38 for the lead 35 has one of its ends secured within the plug 34 by a set screw 39.

In practice, the lead 35 is connected to one terminal of the battery of the automobile. Current flows from the battery through the lead 35, contacts 37 and 31, lead 30, one of the pins 28 and one of the clamps 27 to the adjacent ends of the filaments 19. The current passes through the filaments 19 to the other clamp 27 and pin 28, and thence back to the battery by way of the frame of the automobile. As the casing 6, reflector 7 and lamp 16 are of elongated formation and extend in a horizontal direction across the front of the automobile, the beam of light emanating from the headlight will be wide and sufficiently wide to brilliantly illuminate the middle as well as the sides of the road. By removing the retaining member 9 and lens 8 and by turning the sockets 21 forwardly or rearwardly with respect to the sockets 20, the lamp 16 may be readily adjusted into the focal center of the reflector 7. The springs 22 and clamps 27 render it impossible for the lamp 16 to become accidentally detached from the sockets 21, while permitting it to be readily connected thereto or disconnected therefrom. As the pins 28 are slidably associated with the sockets 21 and as they are constantly urged in the direction of the clamps 27 by the springs 29, an electrical connection is maintained between the lamp 16 and the storage battery in any position of the former.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

A headlight having sockets, other sockets adjustably connected to said first sockets and provided in their bases with recesses, a lamp provided with studs fitting in the adjustable sockets and having extensions fitting in the recesses of said sockets, springs carried by the adjustable sockets and contacting with the studs, clamps secured within the recesses of the adjustable sockets and engaging the extensions, and yielding conductor pins carried by said first sockets and electrically connected with the clamps.

In testimony whereof I affix my signature.

HAROLD OTIS WOODRUFF.